Aug. 3, 1937.    J. W. LEIGHTON    2,088,798
SHOCK ABSORBER LINK CONNECTION
Filed March 13, 1936
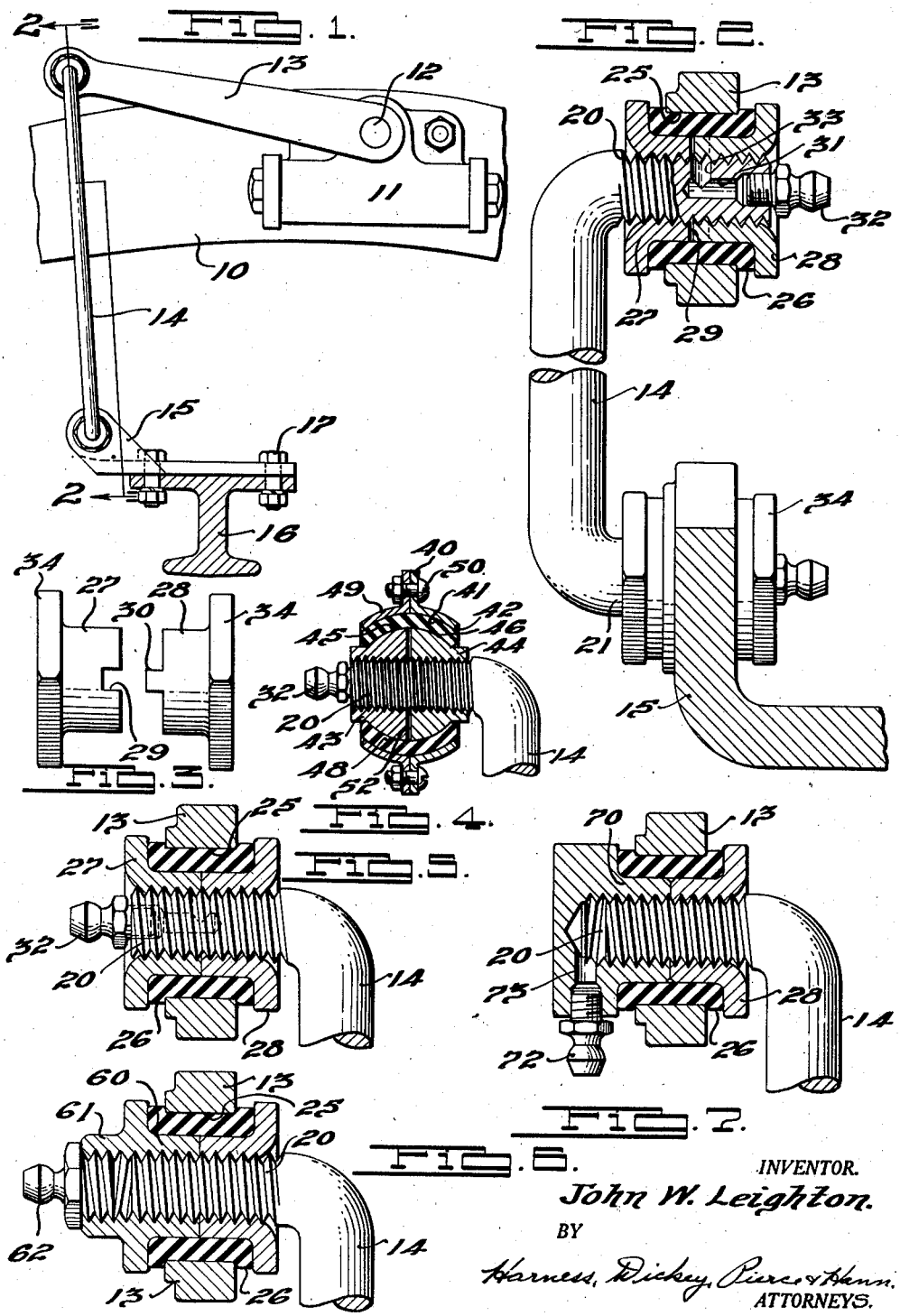
INVENTOR.
John W. Leighton.
BY
Harness, Dickey, Pierce & Henn.
ATTORNEYS.

Patented Aug. 3, 1937

2,088,798

UNITED STATES PATENT OFFICE 2,088,798

SHOCK ABSORBER LINK CONNECTION

John W. Leighton, Port Huron, Mich.

Application March 13, 1936, Serial No. 68,594

8 Claims. (Cl. 287—93)

The invention relates to oscillating connections of the type used on shock absorber links, drag links, radius rods, and the like.

One object of the present invention is to provide an oscillating connection of the type mentioned which will permit free oscillation and universal movement of the links or connecting members without danger of looseness or rattling and which will be easy to assemble and cannot become accidentally loosened.

Another object of the invention is to provide an improved shock absorber link connection or the like which will permit relative sidewise movement of the parts to which the shock absorber is connected without causing bending in the connection or causing undesirable bending or other strains in the parts connected.

Another object of the invention is to provide an improved shock absorber link connection or the like, which will dampen or avoid noises that might otherwise occur when the movement of the link is suddenly reversed or changed.

Referring to the drawing wherein like numerals are applied to like parts in the several views, Figure 1 is an elevational view partly in section of a portion of an automobile showing the manner in which the oscillating connection is used on a shock absorber link.

Figure 2 is a sectional view taken on the line 2—2 of Figure 1.

Figure 3 is a view of the two-part bearing utilized in the connection.

Figures 4, 5, 6, and 7 show modified forms of the connection.

Referring to Figure 1 of the drawing, there is shown a portion of an automobile frame at 10, upon which is mounted the casing 11 of a shock absorber. The shock absorber is actuated by a shaft 12 which in turn is operated by an arm 13 in the usual manner. An operating link 14 is pivotally connected to the free extremity of arm 13 and to a bracket 15 secured to the axle 16 of the automobile by means of bolts 17. By reason of these connections relative movement between the axle and frame is inhibited by means of the shock absorber in the usual manner. Shock absorber links are subject to severe and rapid oscillation under heavy load and adverse operating conditions, with the result that there is a tendency of the oscillating connection to become loose and to rattle. This tendency is further increased by the fact that during side swaying movements of the car, the connections between the link 14, the arm 13 and bracket 15 must have a limited universal action.

In accordance with the present invention, a pair of oscillating connections are provided between the link 14, the arm 13, and the bracket 15 which will permit a limited universal action and free oscillation of the link about its connections, and substantially avoid play or rattle in the parts, and also avoid or dampen noises even though play or looseness occurs in the connections.

As shown best in Fig. 2, these connections are formed by providing bent-over end portions 20 and 21 on opposite ends of the links 14, which end portions extend parallel to each other and are provided with conventional threaded bearing surfaces. These bent-over threaded portions constitute the journals of the respective connections. The nature of the two connections, which are identical, is shown best in connection with the upper end of the link in Figure 2, and hence the description may be limited to this connection.

The shock absorber arm 13 is provided with an opening 25 adjacent its outer end, into which the bent-over end or journal 20 of the link 14 extends. Between the journal 20 of the link and the walls of the opening 25 is provided an annular ring of soft, flexible, non-porous rubber at 26 and a pair of flanged bearing sleeves 27 and 28, which are threaded upon the journal 20 and have flanges of larger size than opening 25. The annular rubber member is preferably cylindrical in form, but when the parts are assembled the edges of the rubber ring are compressed axially between the flanges on sleeves 27 and 28, with the result that the edges of the rubber ring are deformed upwardly between the flanges and the member 13, as shown in Figure 2. But if desired the rubber ring may be molded to the form shown in Figure 2. Either arrangement provides a resilient abutment against end thrust. The adjacent edges of the bearing sleeves 27 and 28 are provided respectively with a groove 29 and a tongue 30, which are adapted to interlock when the parts are assembled to prevent relative rotation between the bearing sleeves.

The journal 20 of link 14 is provided with a drilled hole 31 into which is screwed a lubricating fitting 32; and the drilled hole 31 is in communication with a cross-bore 33, which conducts lubricant to the threaded bearing surfaces between the sleeves and the threaded journal 20.

It will be observed that by reason of the end compression on the annular rubber ring 26, the same will be expanded radially and will therefore be compressed tightly within the annular space between the walls of opening 25 and the outer walls of the bearing sleeves 27 and 28, thus providing a tight but cushioned connection between the link 14 and the arm 13. In addition, the fact that the annular rubber ring 26 is compressed axially by the bearing sleeves results in a reaction force tending to separate the two bearing sleeves and thus maintain them respectively in tight engagement with one side of the inclined surfaces forming the threaded bearing. This prevents any rattling due to looseness of the parts without in any way interfering with the free oscillation of the links 14 with respect to the arm 13. It will be observed that in the event of wear the tendency of the rubber ring to expand axially will separate the two bearing sleeves and maintain them in tight bearing engagement. The interlocking groove and tongue 29 and 30 prevent relative rotation between the two bearing sleeves, with the result that it is impossible for the device to become accidentally loosened during use.

The joint may be assembled in several ways. For example, the annular rubber ring 26 and the two bearing sleeves 27 and 28 may be assembled in the opening 25 of arm 13 in the manner shown in Figure 2 and compressed tightly together. Thereupon the link 14 and arm 13 may be rotated relatively, either one remaining stationary, until the journal or end 20 of the link is threaded into both of the bearing sleeves. The same method may be followed then with respect to the joint at the opposite end of the link. If this method is followed, it may be advantageous to connect the bracket 15 and the arm 13 to the link prior to assembly of these three elements in the automobile.

In the modification shown in Figure 4, which is preferred in cases where the universal action is substantial, the shock absorber arm 40 is provided with an annular spherical recess 41 having a central opening 42 stamped from the material of the arm. The two bearing sleeves 43 and 44 are provided on their adjacent ends with surfaces 45 and 46 lying in the surface of a sphere whose center is on the axis of the threaded journal 20. An annular rubber ring 48 is positioned between the spherical surfaces on the bearing sleeves 45 and 46 and the walls of the spherical recess 41 in the supporting arm 40; and this ring is clamped tightly against the bearing sleeve by means of a clamping ring 49 having an annular spherical surface. This ring 49 is bolted by means of bolts 50 to the arm 40. It will be observed that in this form there is no tendency of the bearing sleeves to pinch the annular rubber ring 48 during universal movement of the journal 20. In addition, it may be noted that in this form the resilient rubber ring urges the two bearing sleeves toward each other instead of urging them apart as in the modification previously described. The action is the same, however, in that the two bearing sleeves are normally separated by a small space 52, and hence are urged towards each other by the rubber ring and therefore into tight bearing engagement with the sides of the threads on trunnion 47. In this form, interlocking tongues and grooves on the two bearing sleeves are not employed inasmuch as the clamping member 49 on the arm 40, acting through the rubber ring 48, prevents separation of the two sleeves. In addition, the friction of the rubber under high pressure tends strongly to prevent any relative rotation.

The form of connection shown in Fig. 4 is readily assembled by inserting the journal 20 through the opening 42, threading the sleeves in place, applying the rubber ring 48 to the sleeves and bolting the clamping ring 49 to the arm 40.

The modification shown in Fig. 5 is identical to that shown in Fig. 2, with the exception that the interlocking tongue and groove on the respective bearing sleeves are omitted. This may be done where it is desired to reduce the cost of the joint inasmuch as the fact that the annular rubber ring 26 is tightly compressed between the flanges on the bearing sleeves 27 and 28 and the walls of the opening 25 in the arm 13, thereby creating considerable friction between the rubber ring and the two bearing sleeves and tending to prevent any relative rotation of the two sleeves.

Figs. 6 and 7 disclose modifications similar to that shown in Fig. 5, except that the lubricating fitting is mounted within the end of the outer bearing sleeve instead of being mounted directly within the trunnion on the extremity of the link. In Fig. 6 the outer sleeve 60 is provided with an axially extending head 61, and the lubricating fitting 62 is threaded into an extension of the threaded bearing surfaces within the interior of the sleeve 60.

In Fig. 7 the outer bearing sleeve 70 is likewise provided with a head but the lubricating fitting 72 is threaded into a cross bore 73, which communicates with the internal threaded bearing surface of the sleeve 70.

Except for the features specifically mentioned, the structures shown in Figs. 5, 6 and 7 are identical to each other and to the structure shown in Fig. 2 in construction, mode of operation, and method of assembly.

It will be observed that in accordance with the present invention there is provided an exceedingly simple oscillating connection for connecting links or other members, in which there is provided automatic take-up means to prevent any looseness or rattling, and in which the forces are effectively cushioned without interfering with the ease of operation or the nature of the rotatable or oscillating bearing surfaces. The device is inexpensive to manufacture and effective in operation. While the invention is shown only in connection with shock absorber links, it is apparent that it is equally applicable to drag links, radius rods, or other connections involving similar movements and transfer of forces.

What is claimed is:

1. An oscillating joint for connecting two members comprising a journal having oppositely inclined bearing surfaces thereon, a pair of bearing sleeves rotatable on said journal and engageable respectively with said oppositely inclined surfaces when urged in opposite directions, and resilient means clamped radially between said other member and said sleeves and clamped axially between said sleeves.

2. An oscillating joint for connecting a member having an opening therein to another member comprising a sleeve of elastic non-metallic material positioned within the opening in said first-mentioned member and extending outwardly of said opening at its opposite ends, a pair of flanged sleeves fitted within said first-mentioned sleeve with their flanges engaging the edges thereof and compressing the same axially, and a journal carried by said other member and having a threaded bearing engagement with the interior of said flanged sleeves.

3. An oscillating joint for connecting a member having an opening therein to another member comprising a sleeve of elastic non-metallic material positioned within the opening in said first mentioned member and extending outwardly of said opening at its opposite ends, a pair of flanged sleeves fitted within said first mentioned sleeve with their flanges engaging the edges thereof and compressing the same axially, and a journal carried by said other member and having a threaded bearing engagement with the interior of said flanged sleeves, said sleeves having interengaging positions adapted to prevent relative rotary motion therebetween.

4. An oscillating joint comprising a journal having oppositely inclined bearing portions converging outwardly of the axis thereof, a pair of annular bearing members adapted to engage said portions when said members are urged toward each other and means for resiliently urging said bearing members toward each other and into engagement with said bearing surfaces, said means including inclined outwardly converging surfaces on the adjacent ends of said bearing members, an elastic non-metallic annular member surrounding said surfaces, and means for exerting inwardly directed axial forces on said elastic member.

5. An oscillating joint comprising a journal having oppositely inclined bearing portions converging outwardly of the axis thereof, a pair of annular bearing members adapted to engage said portions when said members are urged toward each other, the adjacent ends of said members being formed to provide a composite surface lying in a sphere whose center is in the axis of said journal and midway between said adjacent ends, an annular member formed of elastic non-metallic material and surrounding said spherical surface, and spherical clamping means adapted to clamp said elastic member into tight engagement with the spherical surfaces on the adjacent ends of said bearing members.

6. An oscillating joint comprising a threaded journal, a pair of threaded bearing sleeves threaded on said journal with their adjacent ends out of contact, the adjacent ends of said sleeves having radial extensions, and resilient means for engaging said sleeve extension and exerting oppositely directed axial forces thereon.

7. An oscillating joint comprising a threaded journal, a pair of threaded bearing sleeves threaded on said journal with their adjacent ends out of contact, said adjacent ends having external surfaces lying in a common sphere, whose center is in the axis of said journal and midway between said sleeves, an elastic non-metallic member surrounding said spherical surfaces and means for clamping said elastic member into engagement with said surfaces.

8. An oscillating joint for connecting two members comprising a threaded journal fixed to one of said members, a pair of internally threaded bearing sleeves having a threaded bearing engagement with said journal, the other of said members having means adapted to surround both of said sleeves in spaced relation thereto, and resilient means between said last named means and said sleeves for supporting said sleeves with respect to said other member and urging the sleeves in opposite directions on said threaded journal to tightly engage the threads on the sleeves with the threads on the journal without preventing rotation of the sleeves relative to the journal.

JOHN W. LEIGHTON.